United States Patent [19]

Nussbaumer

[11] 4,048,485
[45] Sept. 13, 1977

[54] DIGITAL FILTER GENERATING A DISCRETE CONVOLUTION FUNCTION

[75] Inventor: Henri J. Nussbaumer, LaGaude, France

[73] Assignee: International Business Machines Corporation, Armonk, N.Y.

[21] Appl. No.: 670,325

[22] Filed: Mar. 25, 1976

[30] Foreign Application Priority Data

Apr. 16, 1975 France .................................. 75.12557

[51] Int. Cl.$^2$ ......................... G06F 7/38; G06F 15/34
[52] U.S. Cl. .................................... 235/156; 328/167
[58] Field of Search ............... 235/152, 156; 328/167; 333/18, 28, 70 T; 325/42

[56] References Cited

U.S. PATENT DOCUMENTS

| 3,679,882 | 7/1972 | McAuliffe | 235/156 |
| 3,803,391 | 4/1974 | Vernet | 235/152 |
| 3,926,367 | 12/1975 | Bond et al. | 235/156 X |
| 3,971,927 | 7/1976 | Speiser et al. | 235/156 X |
| 3,980,873 | 9/1976 | Mattei | 235/156 |

OTHER PUBLICATIONS

C. M. Rader, "Discrete Convolutions Via Mersenne Transforms" IEEE Trans. on Computers, vol. C-21, No. 12, 12-1972, pp. 1269-1273.

*Primary Examiner*—Jerry Smith
*Attorney, Agent, or Firm*—Delbert C. Thomas

[57] ABSTRACT

A digital filter is disclosed which includes a circular convolution device using the Complex Mersenne transform to convert a sequence of values $A_n$ into another sequence $A_k$ in which $$A_k = \sum_{n=0}^{4p-1} a_n j^{nk} 2^{nk}.$$

where $p$ is prime number and $j$ is the square root of minus one. The convolutor is provided with an input for applying fixed length data blocks made up of input samples appended with an equal number of zeros; circuits for recirculating and accumulating said data; a register for storing said accumulated data; switches for selectively connecting the output of the storage to the inputs of an adder-subtractor; a product device for term-by-term multiplying of the output of the adder-subtractor with the Complex Mersenne transforms of the filter coefficients set appended with zeros; and an inverse transform device for performing the inverse Complex Mersenne transform on the multiplier output blocks of data. The filtered output samples are provided by adding the inverse Mersenne transforms performed on two consecutive data blocks.

8 Claims, 12 Drawing Figures

DIGITAL FILTER GENERATING A DISCRETE CONVOLUTION FUNCTION

BACKGROUND OF THE INVENTION

This invention relates to convolution function generators and to their utilization in digital filters.

The values of the samples $y_n$ of a signal provided by a filter discretely defined by coefficients $h_n$ and fed by samples $x_n$ of a signal to be filtered are derived from the following convolution relation:

$$y_n = x_n \times h_n = \sum_{m=0}^{N} x_m \cdot h_{n-m}.$$

which shows the need for convolution function generators.

The more obvious manner for building such a device consists in using N+1 multipliers and N adders thus directly performing the operations symbolized by expression (1). However, this is not the least expensive mode, nor the fastest. More especially, the filtering quality relates directly to the value of the parameter N: the greater N is, the better the filtering.

Under such constraints, attempts have been made to build devices requiring less calculation power while giving an equivalent filtering quality. For this purpose, consideration was given to using the properties of certain mathematical transforms among which, one may mention the Fourier transform or the Mersenne transform described by Charles M. Rader in an article entitled: "Discrete Convolution via Mersenne Transforms", published in the "IEEE Transactions on Computers", Vol. C.21, No. 12, December, 1972, pages 1269 to 1273. This Mersenne transform and its inverse show several desirable properties. First of all, term-to-term products in the transform domain correspond to the convolutions in the object domain. Otherwise stated, if $X_k$ and $H_k$, respectively, are the transforms of the $x_n$ and $h_n$ terms, and if the term-to-term products $X_k \cdot H_k = Y_k$ are carried out, the application of the inverse Mersenne transform to the $Y_k$'s provides the desired $y_n$'s. Thus, the convolution theorem applies to the Mersenne transform. In addition, the transpositions from the object domain to the Mersenne one, and the converse, require only additions and shifts, which shows the reason for the interest taken in a convolution function generator based on the properties of the Mersenne transform.

However, one of the major disadvantages of such a device lies in the fact that it must be able to process words whose size depends on the number of samples $x_n$ and $h_n$, to which the transforms are applied, thus practically limiting the application of this solution to short convolutions.

OBJECTS OF THE INVENTION

One of the objects of this invention is to define a convolution function generator which, with an equivalent computing power, enables the processing of sequences longer than those which are practical in Mersenne convolutors.

Another object of this invention is to provide digital filters.

These and other objects, advantages and features of the present invention will become more readily apparent from the following specification when taken in conjunction with the appended drawings.

SPECIFICATION

Figure 1:
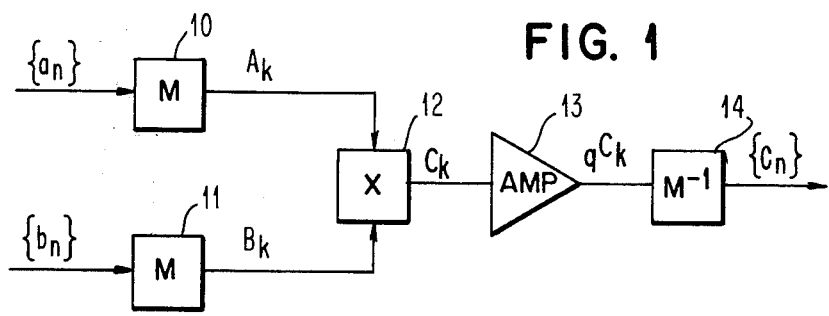
FIG. 1 is a functional block diagram of a convolution function generator.

For a better understanding of this invention, it will be useful to recap the basic principles of the Mersenne transform. Let $p$ be a prime member; a Mersenne number $M_p$ is defined by the relation: $M_p = 2^p - 1$. We can now define the Mersenne transform of a set of $p$ integers $\{a_n\}$ as a set of $p$ integers $\{A_k\}$ each given by:

$$A_k = ((\sum_{n=0}^{p-1} a_n \cdot 2^{nk})) \text{ where } k = 0, 1, ..., p-1.$$

Also, an inverse Mersenne transform is defined which converts the $\{A_k\}$'s back into $\{a_n\}$'s by using the following operation:

$$a_n = ((q \sum_{k=0}^{p-1} A_k 2^{<-nk>})) \text{ where } n = 0, 1, ..., p-1.$$

with $$q = M_p - \frac{M_{p-1}}{p} \text{ and } ((p\,q)) = 1$$

In these expressions, the use of double parentheses (( )) means that the enclosed expression is taken modulo $m_p$ and the use of $<\ >$ means that the operation is performed modulo $p$.

It should be noted that the computation of both direct and inverse transforms requires only additions and binary denomination shifts.

In addition, it may be demonstrated that the convolution theorem applies to the Mersenne transform. In other words, if $\{A_k\}$ and $\{B_k\}$ respectively, are the Mersennes transforms of two series $\{a_n\}$ and $\{b_n\}$, one can recover a series $\{c_n\}$ by applying the inverse transform, to a series $C_k = ((A_k \cdot B_k))$, and said $\{c_n\}$ will verify the following expression:

$$c_n = ((\sum_{m=0}^{p-1} a_m \cdot b_{<n-m>})).$$

This shows a circular convolution operation on $\{a_n\}$ and $\{b_n\}$. Therefore, it is possible to build a convolution function generator according to the diagram shown on FIG. 1. Series $\{a_n\}$ and $\{b_n\}$ are transformed into signals $\{A_k\}$ and $\{B_k\}$ respectively by using Mersenne converters 10 and 11 respectively. These terms are then multiplied by pairs in multiplier 12 provide values $C_k = A_k \cdot B_k$. The use of an amplifier 13 provides values $qC_k$. An inverse Mersenne transform is then performed in inverter 14 to provide terms $\{c_n\}$ such that:

$$c_n = ((\sum_{m=0}^{p-1} a_m \cdot b_{<n-m>})).$$

The use of the Mersenne transform allows the reduction of the number of operations to be carried out by the convolution to $3p(p-1)$ additions, $(p-1)^2$ shifts and only $2p$ multiplications. The multiplications being the most expensive operations, the corresponding structure is already advantageous in comparison with a device directly generating all the sums and products of expression (1).

Actually, the digital filtering operations essentially require aperiodic convolutions. It will be shown later how said aperiodic convolutions can be converted to circular convolutions. It will also be shown that this results in an increase of the number $p$ of values to be processed. In the Mersenne transform, the word length relates to the number of points, since the operation is performed modulo $2^p-1$. Such an increase in word length leads to a major disadvantage in using Mersenne transforms.

To obviate these disadvantages, a complex Mersenne transform will be defined and used in this application. In effect, let us define a transform of a set of $4p$ integers $\{a_n\}$ as a set of $4p$ integers $\{A_k\}$ defined by:

$$A_k = ((\sum_{n=0}^{4p-1} a_n j^{nk} 2^{<nk>})) \quad \text{where } k = 0, 1, \ldots, 4p-1 \quad \text{and } j = \sqrt{-1} \tag{2}$$

with $p$ being a prime number and the quantities between $(( ))$ and $<>$ being respectively taken modulo $M_p = 2^p-1$ and modulo $p$.

It can be shown that an inverse transform of (2) exists which can be written as follows:

$$a_n = ((q \sum_{k=0}^{4p-1} A_k j^{-mk} 2^{<-mk>})) \tag{3}$$

provided that a value $q$ such that $((4p\,q)) = 1$ is defined. For this purpose, it was chosen to take:

$$q = \frac{M_p - \frac{(M_p - 1)}{2p}}{2}.$$

Also, it can be shown that the convolution theorem applies to this new transform and, provided that $m+1-n=0$ or $4p$:

$$c_n = ((\sum_{m=0}^{4p-1} a_m \cdot b_{(n-m) \text{ modulo } 4p})).$$

In this case, the procedure operates modulo $(2^p-1)$ on a set of $4p$ points, and the size of the words to be processed is therefore reduced by four, as compared to a conventional Mersenne transform.

In addition, $$A_k = ((\sum_{s=0}^{p-1}(a_{4s} \cdot 2^{<4sk>} + a_{4s+1} j^k 2^{<(4s+1)k>}$$
$$+ a_{4s+2}(-1)^k \cdot 2^{<(4s+2)k>} + a_{4s+3}(-j)^k \cdot 2^{<(4s+3)k>})) \tag{4}$$

where $k = 0, 1, \ldots, 4p - 1$.

where $k = 0, 1, \ldots, 4p-1$.

By limiting $k$ to the integer values from 0 to $p-1$ and by defining terms $A_{i,k}$ as follows:

$$A_{1,k} = ((\sum_{s=0}^{p-1} a_{4s} \cdot 2^{<4sk>})) \qquad A_{2,k} = ((\sum_{s=0}^{p-1} a_{4s+1} \cdot 2^{<(4s+1)k>}))$$
$$A_{3,k} = ((\sum_{s=0}^{p-1} a_{4s+2} \cdot 2^{<(4s+2)k>})) \qquad A_{4,k} = ((\sum_{s=0}^{p-1} a_{4s+3} \cdot 2^{<(4s+3)k>})) \tag{5}$$

expression (4) becomes =

$$A_k \cdot 1,k\, A_{1,k} + (-1)^k A_{3,k} + j^k[A_{2,k} + (-1)^k A_{4,k}]))$$
$$A_{k+p} = ((A_{1,k} - (-1)^k A_{3,k} + j^{k+p}[A_{2,} + (-1)^{k+p} A_{4,k}]))$$
$$A_{k+2p} = ((A_{1,k} + (-1)^k A_{3,k} + j^k[A_{2,k} + (-1)^k A_{4,k}]))$$
$$A_{k+3p} = ((A_{1,k} - (-1)^k A_{3,k} - j^{k+p}[A_{2,k} + (-1)^{k+p} A_{4,k}])). \tag{6}$$

These expressions (6) show that the convolution function generator of this invention will have to determine the transforms of the values to be processed for only one-fourth of the field length, i.e., for $k$ varying from 0 to $p-1$. The other values from $p$ to $4p$ are generated by combining the components $A_{1,k}$, $A_{2,k}$, $A_{3,k}$ and $A_{4,k}$. Furthermore, the generator could provide the real and imaginary components of these transforms, by simple additions and subtractions of the same terms, namely:

$A_{1,k} \pm A_{3,k}$ and $A_{2,k} \pm A_{4,k}$.

For a better understanding of these properties, it is also possible to distinguish whether $k$ is even ($k=2u$) or odd ($k=2u+1$) with $0 \leq u \leq p(-1/2)$ $$A_{2u} = ((A_{1,2u} + A_{3,2u} + (-1)^u(A_{2,2u} + A_{4,2})))$$

$$A_{2u+p} = ((A_{1,2u} - A_{3,2u}(( + (-1)^u + \frac{p-1}{2} j\,((A_{2,2u} - A_{4,2u})))$$

$$A_{2u+2p} = ((A_{1,2u} + A_{3,2u} 31 (-1)^u (A_{2,2u} + A_{4,2u})))$$

$$A_{2u+3p} = ((A_{1,2u} - A_{3,2u})) - (-1)^u + \frac{p-1}{2} j\,((A_{2,2u} - A_{4,2u}))$$

$$A_{2u+1} = ((A_{1,2u+1} - A_{3,2u+1})) + (-1)^u j\,((A_{2,2u+1} - A_{4,2u+1}))$$

$$A_{2u+p+1} = ((A_{1,2u+1} + A1 + (-1)^u + \frac{p-1}{2}(A_{2,2u+1} + A_{4,2u+1})))$$

$$A_{2u+2p+1} = ((A_{1,2u+1} - A_{3,2u+1})) - (-1)^u j\,((A_{2,2u+1} - A_{4,2u+1}))$$

$$A_{2u+3p+1} = $$
$$((A_{1,2u+1} + A_{3,2u+1} - (-1)^u + \frac{p+1}{2}(A_{2,2u+1} + A_{4,2u+1})))$$

These properties also supply for the inverse transform to be applied in terms $\{C_k\}$ in order to obtain the values $\{c_n\}$. In effect, by limiting the values of $m$ from 0 to $p-1$.

$$c_m = ((c_{1,m} + j^{-m} c_{2,m} + (-1)^m c_{3,m} + (-j)^{-m} c_{4,m}))$$

$$c_{m+p} = ((c_{1,m} + j^{-m-p} c_{2,m} - (-1)^m c_{3,m} + (-j)^{-m-p} c_{4,m}))$$

$$c_{m+2p} = ((c_{1,m} - j^{-m} c_{2,m} + (-1)^m c_{3,m} - (-j)^{-m} c_{4,m}))$$

$$c_{m+3p} = ((c_{1,m} \cdot j^{-m-p} c_{2,m} - (-1)^m c_{3,m} - (-j)^{-m-p} c_{4,m}))$$

$$c_{1,m} = ((q \sum_{s=0}^{p-1} C_{4s} 2^{<-4sm>}));$$

$$c_{2,m} = ((q \sum_{s=0}^{p-1} C_{4s+1} 2^{<-(4s+1)m>}));$$

$$c_{3,m} = ((q \sum_{s=0}^{p-1} C_{4s+2} 2^{<-(4s+2)m>}));$$

$$c_{4,m} = ((q \sum_{s=0}^{p-1} i \, C_{4s+3} 2^{<-(4s+3)m>})).$$

Figure 2:
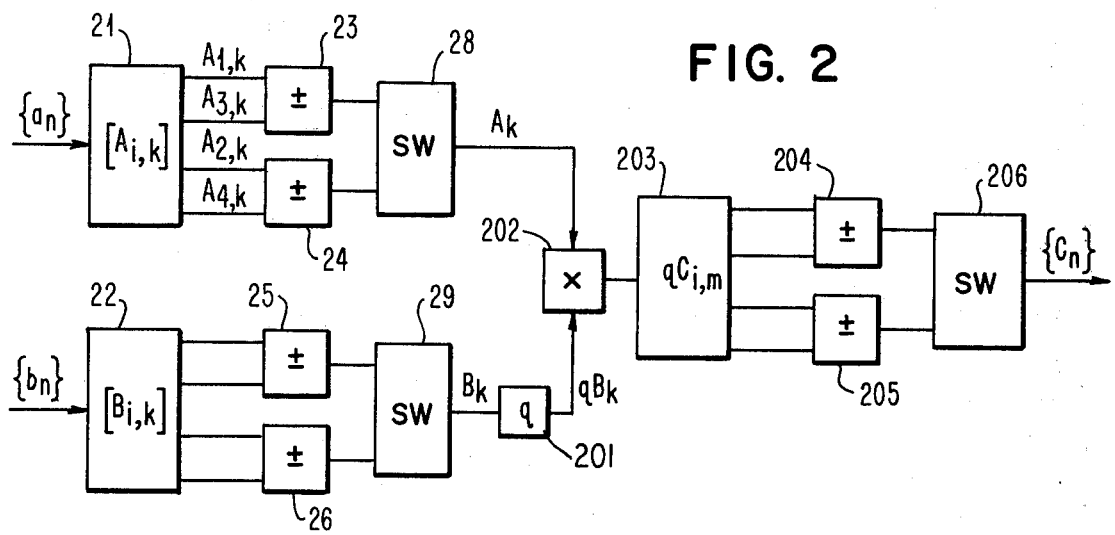
FIGS. 2, 2A and 3 are block diagrams of convolution function generators embodying this invention.

A first functional diagram for the convolution function generator of the invention may now be derived (see FIG. 2). The terms $\{a_n\}$ and $\{b_n\}$ on which, first of all, complex Mersenne transforms will be performed, are sequentially introduced into devices 21 and 22 which, by successive accumulations, build up terms $((A_{i,k}))$ and $((B_{i,k}))$, which then, are added and subtracted in adder-subtractors 23 to 26 inclusive, by grouping the odd $i$'s and the even $i$'s. The outputs of the adder-subtractors 23 to 26 are transmitted to switching devices 28 and 29 which provide terms $((A_k))$ and $((B_k))$, respectively. The $((B_k))$ terms are transmitted to a multiplier 201 for multiplication by $q$ and from there, to a second multiplier 202 also receiving the $((A_k))$ terms and providing $((q A_k B_k)) = qC_k$. Sequence $\{qC_k\}$ is subjected to the operations of the inverse complex Mersenne transformation.

Figure 2A:
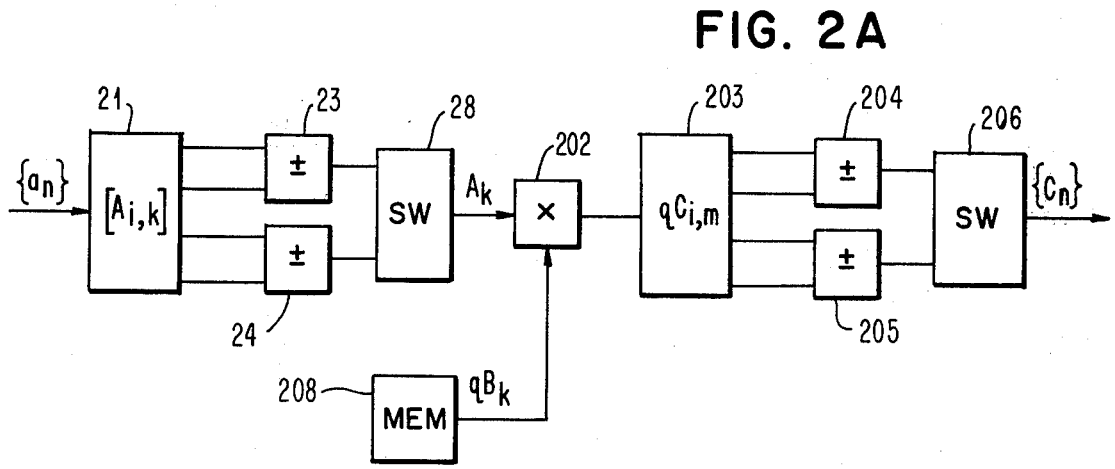

For that, the sequence $qC_k$ is introduced into an accumulation device 203 providing the $qC_{i,m}$ terms which then, are added and subtracted two by two in adder-subtractors 204 and 205 whose outputs are then combined in switch 206 to output the desired terms $\{c_n\}$. If the terms $\{b_n\}$ form a sequence of known fixed values, it is possible to store the previously determined $qB_k$ terms into a sequentially addressed memory 208 as indicated in FIG. 2A, thereby simplifying the function generator.

If there is an interest in only the real component of the output $\{c_n\}$, the device can be further simplified. Such is the case for digital signal filtering where in effect, the desired convolution is real in the object field and only the real terms resulting from the inverse complex Mersenne transform are necessary.

But:

$$c_n = ((q \sum_{k=0}^{4p-1} ((A_k \cdot B_k)) j^{-nk} \cdot 2^{<-nk>})) =$$

$$((q \sum_{k=0}^{4p-1} C_k \cdot j^{-nk} \cdot 2^{<-nk>})).$$

When $k=2u$, $j^{-nk}$ and $j^{nk}$ are both real so that $c_n$ is real. On the contrary, when $k=2u+1$, $j^{-nk}$ and $j^{nk}$ are both real or imaginary depending whether $n$ is even ($n=2k$) or odd ($n=2K+1$). Therefore, it can be written:

$$A_k = A_{2K} + j A_{2K+1}.$$

$$B_k = B_{2K} + j B_{2K+1}.$$

then $$C_k = (A_{2K} B_{2K} - A_{2K+1} B_{2K+1}) + j(A_{2K} B_{2K+1} + B_{2K} A_{2K+1}) = \alpha + j\beta. \tag{9}$$

This solution allows a simplification of the inverse complex Mersenne converter when only the real component (or the imaginary component) of $c_n$ is looked for.

In effect:

$$R(A_{2u+p} \cdot B_{2u+p}) = (((A_{1,2u} - A_{3,2u})(B_{1,2u} - B_{3,2u}) - (A_{2,2u} - A_{4,2u})(B_{2,2u} - B_{4,2u})))$$

$$I(A_{2u+p} \cdot B_{2u+p}) = (-1)^u + \frac{p-1}{2} (((A_{1,2u} - A_{3,2u})(B_{2,2u} - B_{4,2u}) + (-A_{2,2u} - A_{4,2u})(B_{1,2u} - B_{3,27}))) \tag{10}$$

which can be written as:

$$R(A_{2u+p} \cdot B_{2u+p}) = (((A_{1,2u} - A_{3,2u} - A_{2,2u} + A_{4,2u}) \times (B_{1,2u} - B_{3,2u} + B_{2,2u} - B_{4,2u}) - (A_{1,2u} - A_{3,2u})(B_{2,2u} - B_{4,2u}) + (A_{2,2u} - A_{4,2u})(B_{1,2u} - B_{3,2u})))$$

Before further describing an embodiment of a convolution function generator according to this invention, it will be useful to set out some arithmetic properties of the transforms used in this application. It was seen that all the arithmetic operations should be performed modulo $2^p - 1$. This means that the multiplication of a word by a power of two is obtained by a simple order shift of its bits with an end around closure. On the other hand, the required additions can be carried out by the use of conventional binary adders in which the carry bit from the highest binary order is reintroduced into the adder in the lowest order bit position. This corresponds to a 1's complement addition. As to the other multiplications, they are carried out by performing the products of $2p$ bits in a conventional multiplier and by adding, modulo $2^p - 1$, the $p$ bits with the lowest weights, to the $p$ bits with the highest weights. And finally, any negative number is represented in 1's complement form, i.e., it is obtained by a simple inversion of the bits of the corresponding positive number.

Figure 3:
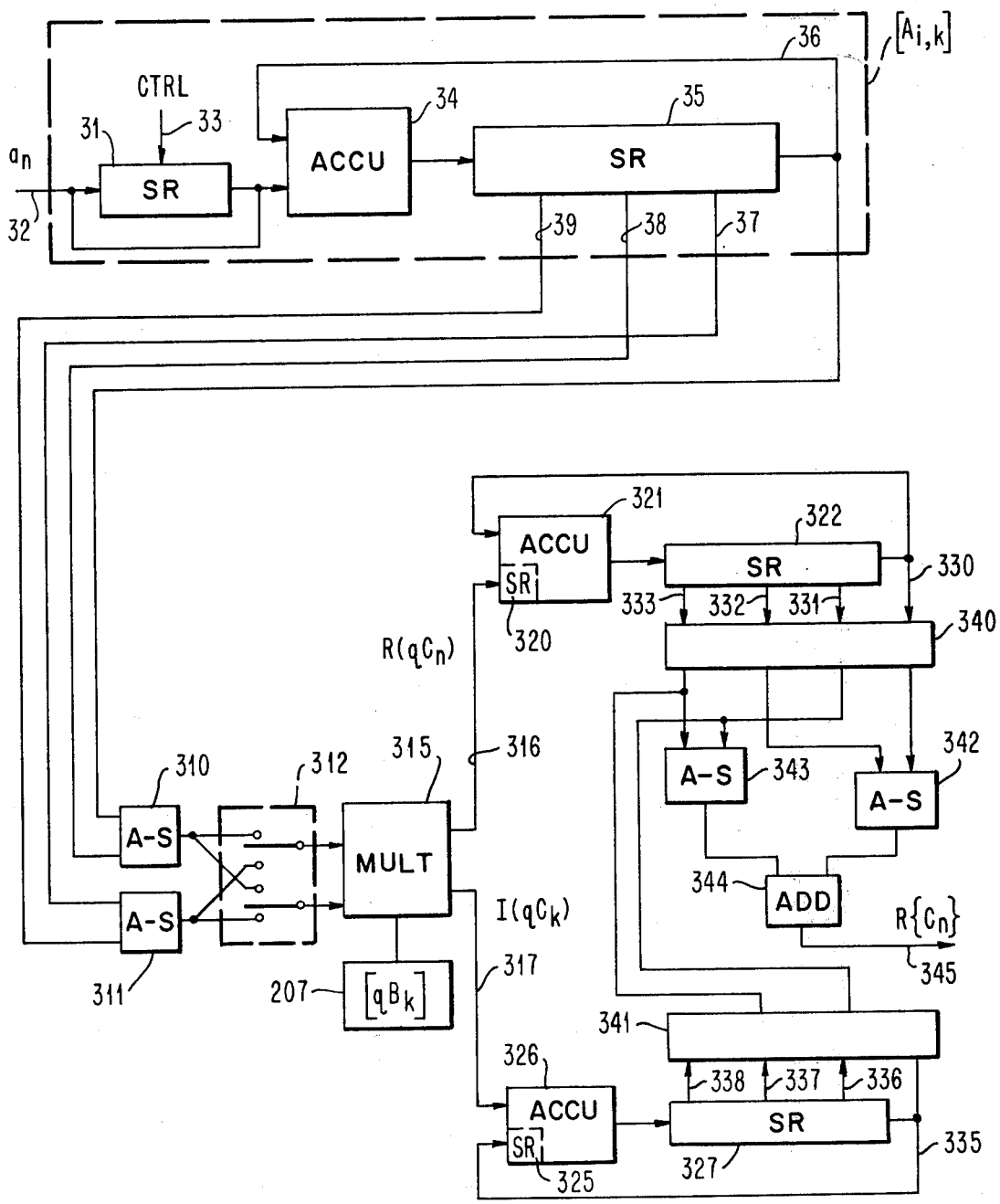
Figure 4A:
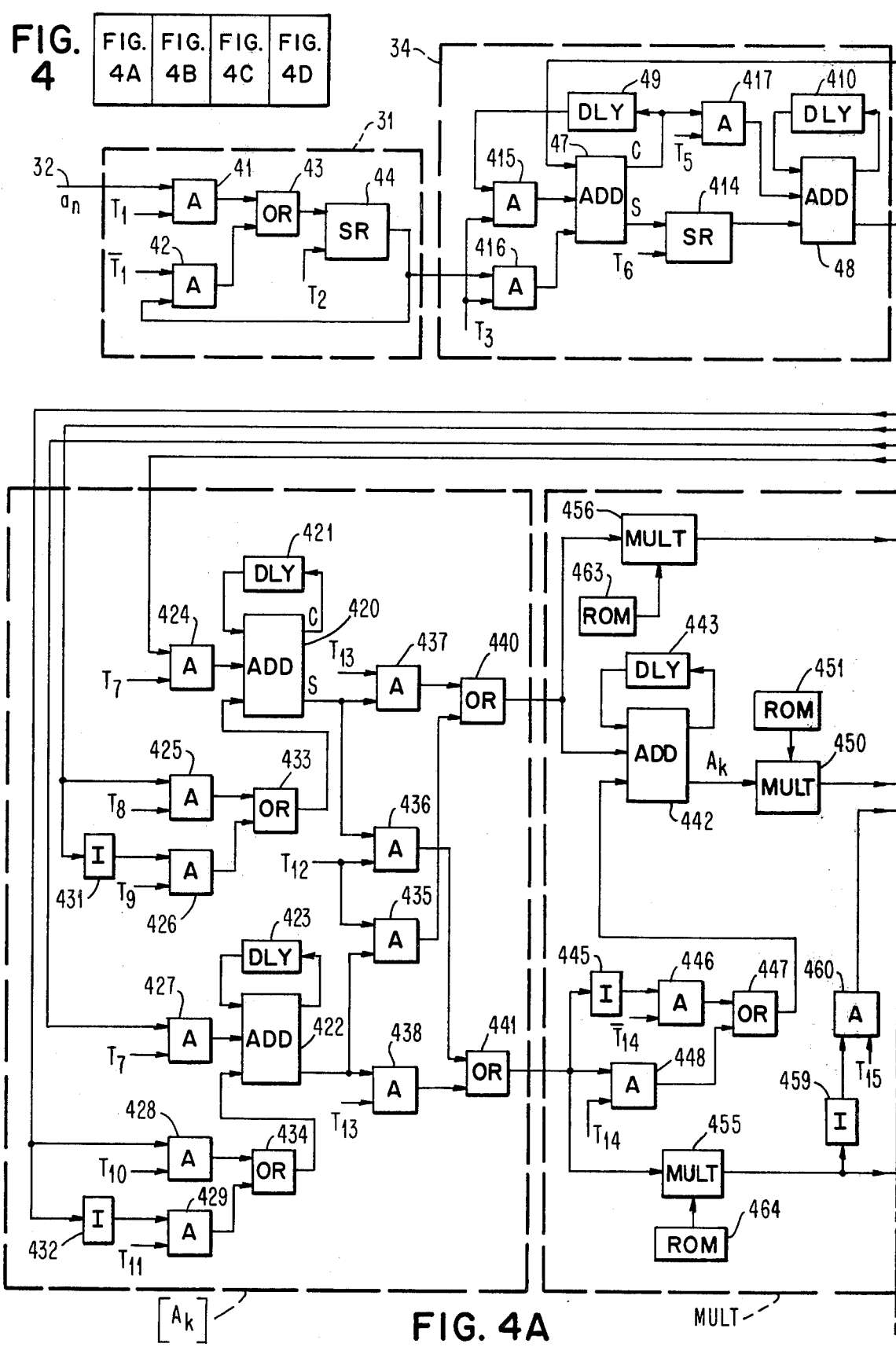
FIG. 4 (4A-4D) shows a schematic diagram of a convolution function generator embodying this invention.
Figure 4B:
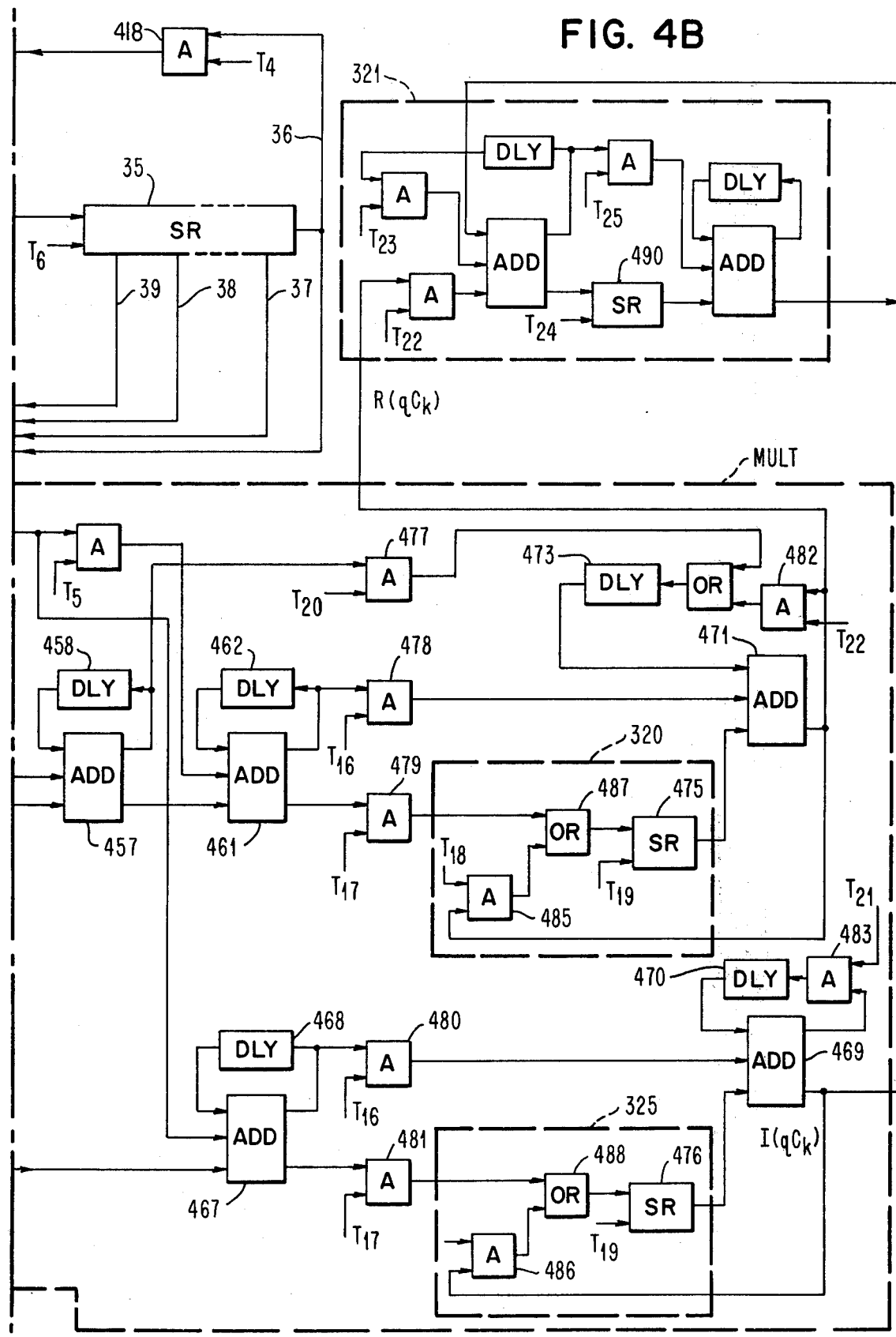
Figure 4C:
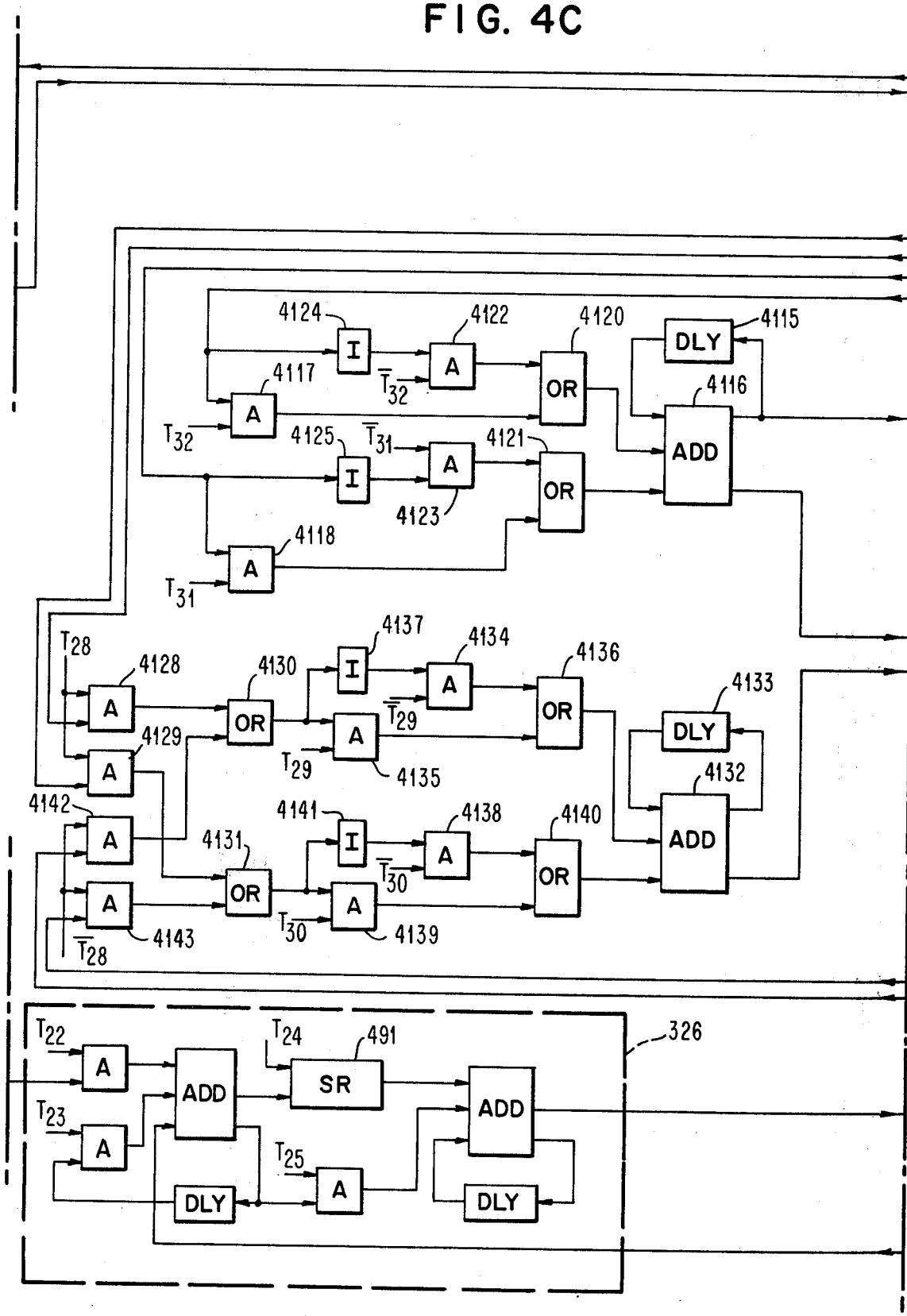
Figure 4D:
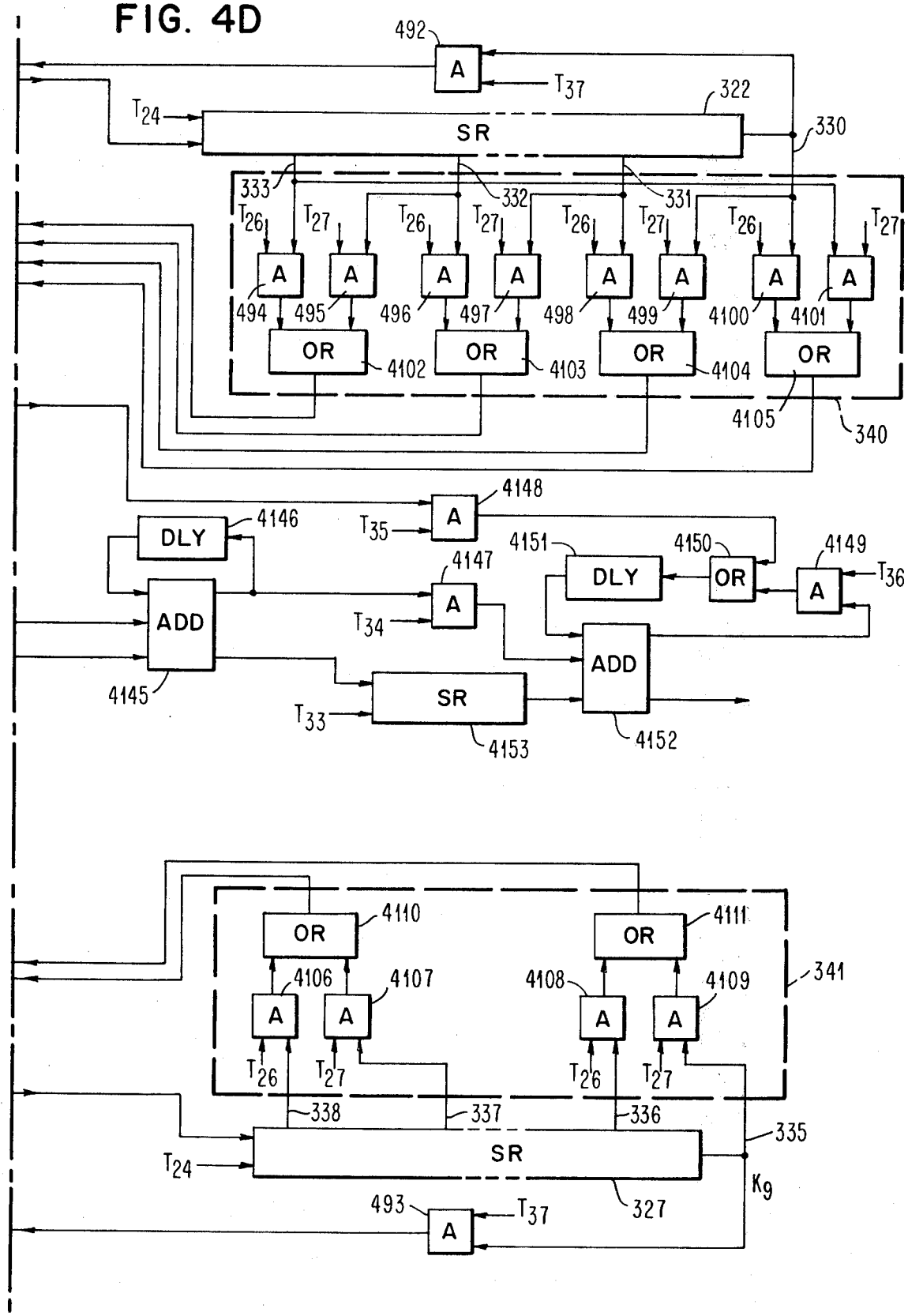

With these properties, the embodiment of the convolutor in FIG. 3 may be described by specifying, in addition, that it is to process two groups of successive terms $a_n$ on a multiplex basis, said groups being referenced $(a_n^1)$ and $(a_n^2)$, respectively. If it is assumed that $p=3$, then $0 \leq k \leq 2$ and $(a_n^1)$ includes terms $a_0$ to $a_{11}$ and $(a_n^2)$ includes terms $a_{12}$ to $a_{23}$. Also, it is assumed that the $(a_n^1)$ terms have already been received at the convolutor input which is now receiving $(a_n^2)$.

Initially, the device should compute:

$$A_{1,k}^2 = ((\sum_{s=0}^{p-1} a_{4s} \cdot 2^{<4sk>})) \text{ where } \begin{cases} A_{1,0}^2 = ((a_{12} + a_{16} + a_{20})) \\ A_{1,1}^2 = ((a_{12} + 2a_{16} + 2^2 \cdot a_{20})) \\ A_{1,2}^2 = ((a_{12} + 2^2 a_{16} + 2a_{20})) \end{cases}$$

$$A_{2,k}^2 = ((\sum_{s=0}^{p-1} a_{4s+1} \cdot 2^{<(4s+1)k>})) \begin{cases} A_{2,0}^2 = ((a_{13} + a_{17} + a_{21})) \\ A_{2,1}^2 = ((2 a_{13} + 2^2 a_{17} + a_{21})) \\ A_{2,2}^2 = ((2^2 a_{13} + 2 a_{17} + a_{21})) \end{cases} \tag{11}$$

-continued $$A^2_{3,k\,23}\left(\left(\sum_{s=0}^{p-1} a_{4s+2} \cdot 2^{<(4s+2)k>}\right)\right) \begin{cases} A^2_{3,0} = ((a_{14} + a_{18} + a_{22})) \\ A^2_{3,1} = ((2^2 a_{14} + a_{18} + 2\, a_{22})) \\ A^2_{3,2} = ((2\, a_{14} + a_{18} + 2^2 a_{22})) \end{cases}$$

$$A^2_{4,k} = \left(\left(\sum_{s=0}^{p-1} a_{4s+3} \cdot 2^{<(4s+3)k>}\right)\right) \begin{cases} A^2_{4,0} = ((a_{15} + a_{19} + a_{23})) \\ A^2_{4,1} = ((a_{15} + 2\, a_{19})) \\ A^2_{4,2} = ((a_{15} + 2^2 a_{19} + 2\, a_{23})) \end{cases}$$

Therefore, the terms $A_{1,k}$, $A_{2,k}$, $A_{3,k}$ and $A_{4,k}$ can be obtained from simple accumulation of the terms of $(a_n{}^2)$ with, if needed, multiplication by 2 or $2^2$. This multiplication by a power of two is obtained by simply shifting the bits one or two orders toward the higher valued end. In the embodiment shown in FIG. 3, a shift register 31 able to receive a word $a_n$ is shown with an input 32. Register 31 has its output fed back to its input to enable each $a_n$ to circulate five times. A CTRL input 33 enables blocking of the transfer of the contents of register 31 for one or two bit times to perform the multiplication by 2 or $2^2$, as necessary. The output of register 31 feeds an accumulator-adder 34 feeding a shift register 35 having a capacity of twenty-three words. The output of register 35 is fed back over line 36 to a second input of adder 34. The terms $((A_{i,k}))$ built up by the accumulator are stored in shift register 35 so that the $A_{1,k}{}^1$ and $A_{i,k}{}^2$'s are interleaved. Their distribution yields to the following configuration, for example, at the beginning of the building of terms $A_{i,k}{}^2$:

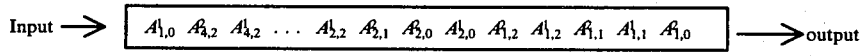

Expressions (11) show that each group of $p$ consecutive terms (three, in this case) includes the same data $a_n$. Taking the interleaving in register 35 into account, the $a_n$ terms should be presented $(2p-1)$ consecutive times to the input of adder 34, but they are to be used only one time out of two, therefore $p$ times, in order not to be introduced into the terms of family $A^1$ when the terms of family $A^2$ are being computed and conversely. For instance, at the beginning of the building of the $A_{i,k}{}^2$, $a_{12}$ appears at an input of adder 34 at the same time as $A_{1,0}{}^2$, then it recirculates without being introduced into adder 34 when $A_{1,1}{}^1$, is blocked again by $A_{1,2}{}^1$ and at last, is introduced into $A_{1,2}{}^2$. From which, one sees that five recirculations $(2p-1)$ are needed in shift register 31. Next $a_{13}$ appears at the input of adder 34 to be assigned to $A_{2,0}{}^2$ and so on until terms $A_{1,0}{}^2$ to $A_{4,2}{}^2$ are developed. But, during this building operation, the terms belonging to family $A^1$ are available on taps 36, 37, 38, and 39 of shift register 35 and are fed into the structure developing the complex Mersenne transforms $\{A_k\}$ of terms $\{a_n{}^1\}$ from the $A_{1,k}{}^1$, $A_{2,k}{}^1$, $A_{3,k}{}^1$ and $A_{4,k}{}^1$'s terms. This part of the structure mainly includes two adder-subtractors 310 and 311 and switching means 312. In effect, it should be noted that:

$$A_k \begin{cases} A^1_0 = ((A^1_{1,0} + A^1_{2,0} + A^1_{3,0} + A^1_{4,0})) \\ A^1_1 = ((A^1_{1,1} - A^1_{3,1})) + j((A^1_{2,1} - A^1_{4,1})) \\ A^1_2 = ((A^1_{1,2} + A^1_{3,2} - (A^1_{2,2} + A^1_{4,2}))) \end{cases}$$

-continued $$A_{k+p} \begin{cases} A^2_3 = ((A^1_{1,0} - A^1_{3,0})) - j((A^1_{2,0} - A^1_{4,0})) \\ A^2_4 = (((A^1_{1,1} + A^1_{3,1}) + (A^1_{2,1} + A^1_{4,1}))) \\ A^2_5 = ((A^1_{1,2} - A^1_{3,2})) + j((A^1_{2,2} - A^1_{4,2})) \end{cases}$$

$$A_{k+2p} \begin{cases} A^2_6 = (((A^1_{1,0} + A^1_{3,0}) - (A^1_{2,0} + A^1_{4,0}))) \\ A^2_7 = ((A^1_{1,1} - A^1_{3,1})) - j((A^1_{2,1} - A^1_{4,1})) \\ A^2_8 = (((A^1_{1,2} + A^1_{3,2}) + (A^1_{2,2} + A^1_{4,2}))) \end{cases}$$

$$A_{k+3p} \begin{cases} A^2_9 = ((A^1_{1,0} - A^1_{3,0})) + j((A^1_{2,0} - A^1_{4,0})) \\ A^1_{10} + (((A^1_{1,1} + A^1_{3,1}) - (A^1_{2,1} + A^1_{4,1}))) \\ A^1_{11} = ((A^1_{1,2} - A^1_{3,2})) - j((A^1_{2,2} - A^1_{4,2})) \end{cases}$$

The inputs of the first adder-subtractor 310 are connected to taps 36 and 38, while the inputs of adder-subtractor 311 are connected to taps 37 and 39. Taking the movement of the data within register 35 into account, if at a given time, adder-subtractor 310 is developing $A_{1,k} + A_{3,k}$ while adder-subtractor 311 is developing $A_{2,k} + A_{4,k}$, after a shifting operation, 310 generates $A_{2,k} - A_{4,k}$ and 311 generates $A_{1,k} - A_{3,k}$. The results provided by the adders 310 and 311 are properly switched by switch 312 so as to bring the terms using $A_{1,k}$ and $A_{3,k}$ (as for $A_{2,k}$ and $A_{4,k}$), to the same input of a multiplying device 315. A memory 207, see FIG. 2A, provides the second terms of the multiplication $((qA_k.B_k)) = qC_k$. As mentioned above, it can be useful to separate the real components $R(qC_k)$ and the imaginary components $I(qC_k)$. Therefore, the two-outputs 316 and 317 of multiplier 315, will deliver these two different components on which the inverse complex Mersenne transform is to be carried out. To this end, zeroes are interleaved between the consecutive $C_k$'s. Therefore, the trains formed on lines 316 and 317 are the terms $qC_2, 0, qC_1, 0, qC_0 \ldots$, ($qC_0$ appearing as the first one in time). It is then necessary to develop terms of type R $((q.c_{i,m}))$ and I $((q.c_{i,m}))$. The devices to be used are similar to the ones described above for developing the terms $A_k$. Therefore, they include, respectively, two sets of shift registers and accumulators, namely 320, 321, 322, and 325, 326, 327. Thus two series $q.c_{i,m}{}^1$ and $q.c_{i,m}{}^2$ are obtained, one in each of shift registers 320 and 325. While one series is being entered in three recirculations, the second one is being used for calculating the inverse transform. Terms $q.c_{i,m}$ are distributed in the registers 320 and 325 as follows:

$$\ldots q.c_{4,0}{}^2, \; q.c_{4,0}{}^1; \; q.c_{3,0}{}^2; \ldots, \; q.c_{1,0}{}^1.$$

The real and imaginary components of terms $q.c._{1,m}{}^1$, $q.c._{4,m}{}^1$, $q.c._{3,m}{}^1$, $q.c._{1,m}$ are taken from taps 330 to 333 and 335 to 338, respectively. The appearance order of these terms on the taps varies according to the circulation of the data in the registers. Two sets of logic circuits 340 and 341 are used for properly orientating the data on the inputs of adder-subtractors 342 and 343. The first adder-subtractor 342 generates terms $q.c._{1,m} \pm q.c._{3,m}$ and thus, is connected to shift register 340 only. The second adder-subtractor 343 is for terms $q.c._{2,m}$ and $q.c._{4,m}$. In this case, for the even $m$'s, it receives the terms from shift register 340 which provides the real components only. On the other hand, for the odd $m$'s, it receives terms provided by shift register 341 processing the imaginary components. Therefore, adder-subtractor 343 provides either R ($q.c._{2,m} \pm q.c._{4,m}$) or I ($q.c._{2,m} \pm q.c._{4,m}$). The results from adder-subtractor 342 and 343 are then added modulo $2p-1$ in adder 344 to provide samples $\{c_n\}$ on output line 345.

Each of the elements described above can be built in different ways. FIGS. 4A through 4D show a more detailed embodiment of the circuits of FIG. 3. It should be noted that the same elements bear the same references on both figures. For a better understanding of the figures, the following indications are believed sufficient. Recirculation stage 31 includes two And gates 41 and 42, an OR logic circuit 43 and a one word length shift register 44. The data introduction is performed from input 32 in series by bit through And 41 which is open on times T1=1; and the circulation of stored data is performed at the times T1=0 through And 42, under the control of clock signal T2 shifting the bits of $a_n$ stored in shift register 44. Adder-accumulator 34 includes two full binary adding stages 47 and 48 each provided with three inputs and two outputs, one output for the sum bit $s$, the second one for the carry bit $c$, and two one-bit time delay elements 49 and 410; a one word length shift register 414; and three gates 415, 416, and 417. At time T3, gate 416 being open, the bits of $a_n$ from shift register 44 are fed to the input of adder 47 together with the preceding carry bit from delay 49 through gate 415 and the bit of word $A_{i,k}$ delivered at the output of shift register 35, FIG. 4B, and reintroduced into adder 47 through a gate 418 open at time T4. These operations enable the accumulation of terms $a_n$ so as to generate the terms $A_{1,0}$, $A_{1,1}$, etc. of expressions (11). But as mentioned above, the module $2p-1$ addition requires the addition of the last carry bit of adder 47 to the lowest order bit of the sum provided by this adder. This addition is performed by shift register 414, gate 417 and adding stage 48 with carry delay 410. The sum output from adder 48 is applied to the input of shift register 35 at the rate defined by clock signal T6. In these conditions, in every three complete circulations of data through shift registers 414 and 31, a complete set of $A_{1,k}{}^2$ is provided while the $A_{i,k}{}^1$'s are available on taps 36, 37, 38 and 39 for the execution of the complex Mersenne transform (and its converse). Successively, these taps deliver:

$A_{1,k}{}^1$, $A_{2,k}{}^1$, $A_{3,k}{}^1$ and $A_{4,k}{}^1$ then $A_{2,k}{}^1$, $A_{2,k}{}^1$, $A_{3,k}{}^1$, $A_{4,k}{}^1$ and $A_{1,k}{}^1$ which will be grouped two by two to form:

$A_{1,k}+A_{3,k}$ and $A_{2,k}+A_{4,k}$ or $A_{2,k}-A_{4,k}$ and $A_{1,k}-A_{3,k}$ by using adder 420 with delay 421 and adder 422 with delay 423 under the control of And circuits 424 to 429, inverters 431 and 432, associated with taps 38 and 39 respectively of shift register 36 and OR circuits 433 and 434. The carry bit with the highest weight resulting from the module $2p-1$ additions carried out by adders 420 and 421 is placed, for these adders, in the result of each addition after the highest bit of the sum word. It will be processed later on in the multiplying stages. It was shown above that due to the circulations in shift register 35, terms $A_{i,k}$ bearing even and odd $i$ appear alternatively at the input of adders 420 and 422. The direction of the outputs of these adders towards the appropriate inputs of multiplying device 315 is obtained by means of four And gates namely 435, and 436 open at times T12 and gates 437 and 438 open at time T13.

Now, the multiplications by $qB_k$ will be described. To this end knowing that when $k$ is even, the transforms of $\{a_n\}$ and $\{b_n\}$ are read, the device, will, first of all, add the outputs of output OR's 440 and 441 in adder 442 with delay 443 to produce:

$$A_k = (((A_{1,k} + A_{3,k}) + (-1)\frac{k}{2}(A_{2,k} + A_{4,k})) ).$$

The inversions of the output of OR 441 are obtained whenever required, by means of inverter 445 and they are transferred through gate 446 open at time $\overline{T14}$, to OR 447, while the transfer of the sign of the output without inversion is done through gate 448, open on T14, and OR 447. The term $A_k$ which is obtained in this way, is multiplied in multiplier 450 by the term $qB_k$ provided by a read-only memory 451. It should be noted that, should the $\{b_n\}$'s be available, it would be possible to use a second converter similar to the one described above, to obtain the $qB_k$'s.

When $k$ is odd, the transforms are complex. Then, they are determined according to expressions (10) and the real components and the imaginary components are separated. Term $(A_{1,k} - A_{3,k})$ is multiplied in a multiplier 455 by $q(B_{2,k} - B_{4,k})$; and $(A_{2,k} - A_{4,k})$, by $q(B_{1,k} - B_{3,k})$ in multiplier 456. Then, the outputs of multipliers 455 and 456 are to be added by adder 467 and delay 468 to obtain the imaginary component of product $q(A_k.B_k)$. As to the real component $R(qA_k.B_k)$, it is obtained by subtracting $(A_{2,k} - A_{4,k})$ from $(A_{1,k} - A_{3,k})$ in adder 442 and delay 443 by means of sign inverter 448, gate 446, OR 447 and inverter 445 and controlled by $\overline{T14}$; by multiplying the term obtained in this way, by $q(B_{1,k} - B_{3,k} + B_{2,k} - B_{4,k})$ from ROM 451 in multiplier 450; then by subtracting term $q(A_{1,k} - A_{3,k})(B_{2,k} - B_{4,k})$ from the result so obtained, in adder 457 with delay 458 by using inverter 459 and gate 460 and at last, by adding $q(A_{2,k} - A_{4,k})(B_{1,k} - B_{3,k})$ in adder 461 with delay 462. Since the operations are carried out with fixed coefficients, terms $q(B_{2,k} - B_{4,k})$, $q(B_{1,k} - B_{3,k})$ and $q(b_{1,k} - B_{3,k} + B_{2,k} - B_{4,k})$ are respectively stored in read-only memories 463, 464 and 451 when building the convolution generator.

The additions in adders 457, 461 and 467 are performed modulo $2p$. To complete their execution modulo $2p-1$, the carry bits are processed by: adders 469 with delay 470 and adder 471 with delay 473, one-word length shift registers 475 and 476 and And gates 477, 478, 479, 480, 481, 482 and 483.

It has been mentioned above that the determination of the inverse transform requires the use of terms $qC_k$ multiplied by powers of two. These operations are performed by recirculations of $R(qC_k)$ and $I(qC_k)$ by means of shift register circuits 320 and 325 which circuits include AND circuits 485, 486, OR circuits 487 and 488 and shift registers 475 and 476 in which the bit shifting pulse T19 is blocked for 0, 1 or 2 bit times according to the value of the power of two of the operation to be performed.

The remaining part of the processing is performed in the right hand half of the FIG. 4 structure. First of all, this structure has means for computing $q.c_{i,m}$ by successive accumulations, in the same way as above for terms $a_n$. This explains the provision of accumulators 321 and 326 similar to accumulator 34, shift registers 490, 322, 491 and 327 and gates 492 and 493. Two series of values $q.c_{1,m}^1$ and $q.c_{i,m}^2$ are stored in shift registers 490, 322 and shift registers 491, 327. Each series of values is provided during three circulations in the registers, while the second series is also available on the taps of shift registers 322 and 37 for use in determining the inverse transform. At a given time, the real components of terms $q.c_{1,m}^1$, $q.c_{4,m}^1$, $q.c_{3,m}^1$, $q.c_{2,m}^1$ are available on taps 330 to 333, respectively, of shift register 322 while the imaginary components appear on taps 335 to 338 of shift register 327. Due to the recirculation in the shift registers 322 and 327, this order changes. It is reestablished by using gates 494 to 4101 with OR's 4102 to 4105 of logic 340 and gates 4106 to 4109 with OR's 4110 and 4111 of logic 341. Then $q.c_{1,m} \pm q.c_{3,m}$ can be determined by using an adder 4116 with its delay 4115 and the associated gates 4117 and 4118 with OR circuits 4120 and 4121 and using Ands 4122, 4123 with inverters 4124, 4125 and OR's 4120, 4121 for sign inversion as required. When $m$ is even, the real component $(q.c_{2,m} \pm q.c_{4,m})$ is determined by using gates 4128 and 4129, OR circuits 4130 and 4131, adder 4132 with its delay 4133, together with sign inverting circuits including gates 4134, 4135, OR circuit 4136 and inverter 4137, gates 4138, 4139, OR circuit 4140 and inverter 4141. When $m$ is odd, imaginary component $I$ $(q.c_{2,m} \pm q.c_{4,m})$ is determined by using the same circuits but switched towards shift register 327 through gates 4142, 4143 opened by $\overline{T28}$. The two sums are added together in adder 4145 with delay 4146. Gate circuits 4147 to 4149, OR circuit 4150, delay 4151 and adder 4152 together with shift register 4153 are used to complete the modulo $2p-1$ addition and thus, provide the desired $\{c_n\} = \{a_n\} \times \{b_n\}$ terms.

The above described convolution function generator is particularly suitable for building a digital filter. However, it should be noted that digital filtering requires the execution of aperiodic convolutions while the convolutor of this invention performs circular convolutions. It will now be shown how this problem can be solved. Assume that digital filtering is to be performed on a signal X discretely defined by its samples $x_i$, see FIG. 5. It is known that samples $y_i$ of the filtered signals are to be developed in accordance with the following convolution equation:

$$y_i = \sum_{m=0}^{N} x_m \cdot h_{i-m} = \sum_{m=0}^{N} h_m \cdot x_{i-m}$$

in which coefficients $h_m$ are defined from the characteristics of the desired filtering function.

Let us assume that a filter with fixed coefficients is to be designed. In such a case, said coefficients form an unvarying series while the $x_i$'s form a random sequence. That is to say for N=4:

$$y_i = \sum_{m=0}^{4} b_m \times x_{i-m}$$

| | | | | | | |
|---|---|---|---|---|---|---|
| $y_i$ | $= b_0 x_i$ | $+ b_1 x_{i-1}$ | $+ b_2 x_{i-2}$ | $+ b_3 x_{i-3}$ | $+ b_4 x_{i-4}$ | |
| $y_{i+1}$ | $= b_0 x_{i+1}$ | $+ b_1 x_i$ | $+ b_2 x_{i-1}$ | $+ b_3 x_{8-2}$ | $+ b_4 x_{i-3}$ | First |
| $y_{i+2}$ | $= b_0 x_{i+2}$ | $+ b_1 x_{i+1}$ | $+ b_2 x_i$ | $+ b_3 x_{i-1}$ | $+ b_4 x_{i-2}$ | Convolution |
| $y_{i+3}$ | $= b_0 x_{i+3}$ | $+ b_1 x_{i+2}$ | $+ b_2 x_{i+1}$ | $+ b_3 x_i$ | $+ b_4 x_{i-1}$ | |
| $y_{i+4}$ | $= b_0 x_{1+4}$ | $+ b_1 x_{i+3}$ | $+ b_2 x_{i+2}$ | $+ b_3 x_{i+1}$ | $+ b_4 x_i$ | |
| $y_{i+5}$ | $= b_0 x_{i+5}$ | $+ b_1 x_{i+4}$ | $+ b_2 x_{i+3}$ | $+ b_3 x_{i+2}$ | $+ b_4 x_{i+1}$ | |
| $y_{i+6}$ | $= b_0 x_{i+6}$ | $+ b_1 x_{i+5}$ | $+ b_2 x_{i+4}$ | $+ b_3 x_{i+3}$ | $+ b_4 x_{i+2}$ | Second |
| $y_{i+7}$ | $+ b_0 x_{i+7}$ | $+ bx_{i+6}$ | $+ b_2 x_{i+5}$ | $+ b_3 x_{i+4}$ | $+ b_4 x_{i+3}$ | Convolution |
| $y_{i+8}$ | $= b_0 x_{i+8}$ | $+ b_1 x_{i+7}$ | $+ b_2 x_{i+6}$ | $+ b_3 x_{i+5}$ | $+ b_4 x_{i+4}$ | |
| $y_{i+9}$ | $= b_0 x_{i+9}$ | $+ b_1 x_{i+8}$ | $+ b_2 x_{i+7}$ | $+ b_3 x_{i+6}$ | $+ b_4 x_{i+5}$ | |
| $y_{i+10}$ | $=$ — | — | — | — | — | Third |
| $y_{i+11}$ | $=$ — | — | — | — | — | Convolution |

The reduction of the digital filtering operation to a succession of circular convolutions is obtained by appending zeroes to terms $x$ and $b$ to form the required sets $\{a_n\}$ and $\{b_n\}$ and then performing circular convolutions on these new sets.

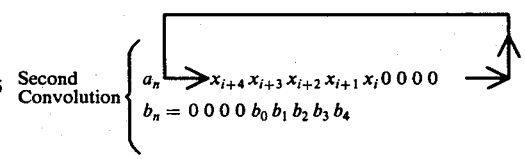

Second Convolution $\begin{cases} a_n \rightarrow x_{i+4}\, x_{i+3}\, x_{i+2}\, x_{i+1}\, x_i\, 0\, 0\, 0\, 0 \\ b_n = 0\, 0\, 0\, 0\, b_0\, b_1\, b_2\, b_3\, b_4 \end{cases}$

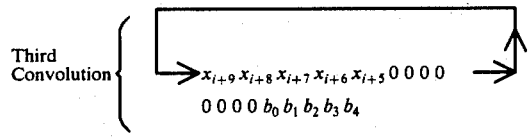

and so on.

Therefore, one has to split the sequence of data applied to the filter input into blocks of fixed length N to which is appended a series of N−1 zeroes. Each sample $y_i$ of the filtered signal will result from the sum of two circular convolutions of length 2N−1. A new convolution using the complex Mersenne transform should be undertaken every N samples $x_i$ of the input signal $x$. For convolutions of length $4p$, the input data sequence $x_i$ should be split into blocks of $2p+1$ samples to which would be appended $2p-1$ zeroes. Actually, it is preferred to use $2p$ data samples and $2p$ zeroes and to ignore the excess convolution term by blocking it on subsequent processing steps. With these conditions, a new circular convolution should be performed every $2p$ points and at any moment, two convolutions are being carried out at the same time. To so perform the filtering operation, the sample blocks will be divided into two series of data which will be completed with zeroes. These series will be provided alternatively towards one then towards the other of two convolution function generators operating according to the functions set out in this invention. Finally, one will obtain the $y_n$ terms by adding the signals delivered by the two convolutors. Having assumed that the $b_n$ terms are of fixed values, their transforms multiplied by $q$ can be previously stored in read-only memories.

Figure 5:
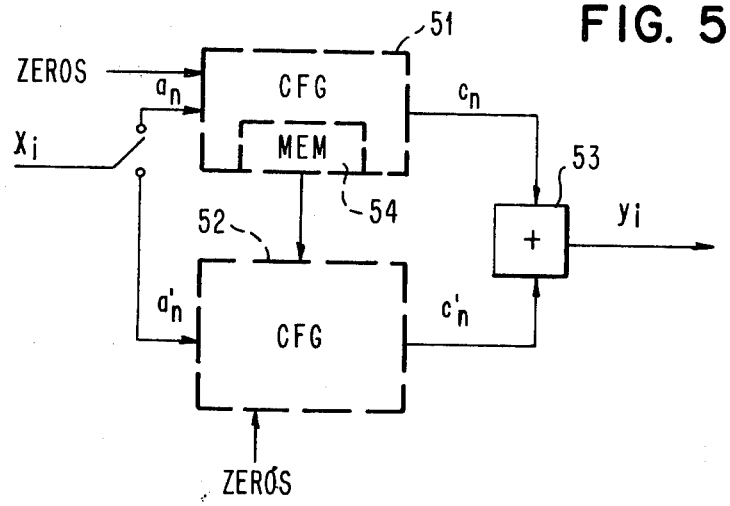
FIGS. 5 and 6 show digital filters embodying the above function generators of this invention.

Therefore, a digital filter can be built as shown in FIG. 5. The samples $x_i$ of the signal to be filtered are divided into blocks of $2p$ samples alternately directed towards the inputs of the two convolution function generators 51 and 52 built as described above with reference to FIG. 4. Each block of samples is completed with $2p$ zeroes before being processed by the generator to which the block is applied. The outputs of these two generators are added in adder 53 to provide filtered samples $y_i$. It should be noted that the coefficient memory 54 is common to both generators.

Figure 6:
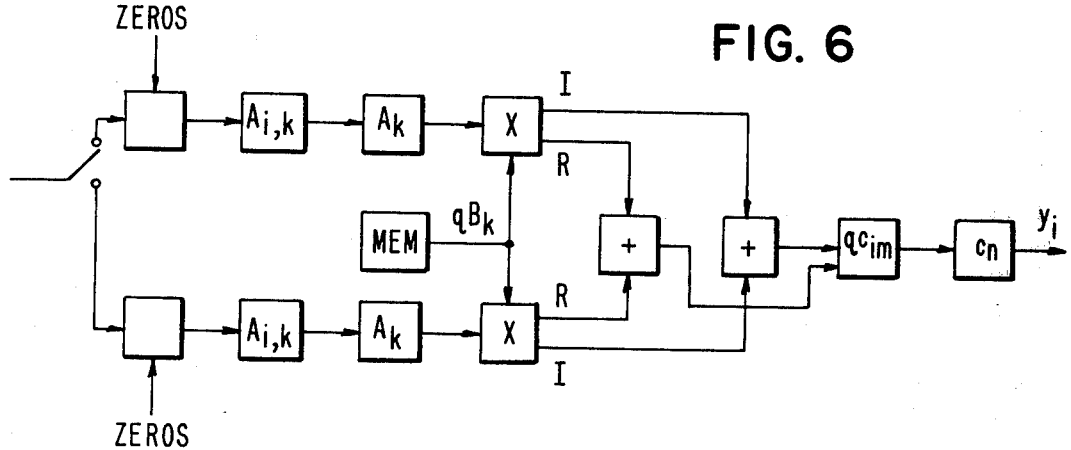

Also, taking into account the fact that the last $2p$ words of each sequence of terms introduced into the generators, are zeroes, building $A_{i,k}$ is twice as fast as the convolution operation. On the other hand, the inverse transform is linear and the addition in adder 53 can be performed before executing this inverse transform. Consequently only the circuits determining the $A_k$ terms from the $A_{i,k}$ and generating the products $qA_k B_k$ are to be duplicated, the remaining part of the circuits, namely the device performing the inverse transform, can be common to both convolution generators 51 and 52 (see FIG. 6).

It will also be noted that the circuits of FIG. 4 can operate for this function provided that they are slightly modified, in a way to allow a simultaneous processing of the $A_{i,k}$ terms belonging to the two consecutive blocks appearing at their inputs. Finally, a single convolution generator could be almost sufficient to provide a filter.

Up to this point, it was shown how the complex Mersenne transform and its inverse can be used to process real numbers and how from there, convolution generators and digital filters could be designed.

Some other advantages of the new transform introduced here proceed from the fact that it fits perfectly for processing complex numbers.

Let $\{a_n + j\, \hat{a}_n\}$ and $\{b_n + j\, \hat{b}_n\}$ be complex sequences and $\{A_k\}$, $\{\hat{A}_k\}$, $\{B_k\}$ and $\{\hat{B}_k\}$ the complex Mersenne transforms of series $\{a_n\}$, $\{\hat{a}_n\}$, $\{b_n\}$ and $\{\hat{b}_n\}$. The complex Mersenne transforms of the complex sequences are:

$$\{((A_k + j\, \hat{A}_k))\} \text{ and } \{((B_k + j\, \hat{B}_k))\}$$

It can be written:

$$C_k + j\, \hat{C}_k = ((A_k B_k - \hat{A}_k \hat{B}_k + j\,(A_k \hat{B}_k + \hat{A}_k B_k))) \quad (12)$$

The inverse transform of $C_k + j\, \hat{C}_k$ yields:

$$c_n + j\,\hat{c}_n = ((\sum_{m=0}^{4p-1} (a_m b_{(n-m)\,\text{modulo}\,4p} - \hat{a}_m \hat{b}_{(n-m)\,\text{modulo}\,4p}))$$

$$+ j((\sum_{m=0}^{4p-1} (a_m \hat{b}_{(n-m)\,\text{modulo}\,4p} + \hat{a}_m b_{(n-m)\,\text{modulo}\,4p})))$$

which corresponds to the circular convolution of two complex sequences.

Figure 7:
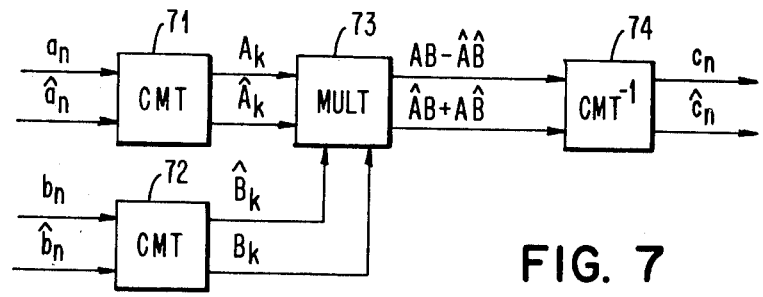
FIG. 7 shows a complex convolution function generator.

FIG. 7 shows how to obtain the terms $c_n$ and $\hat{c}_n$ by using two complex Mersenne transformers (CMT) 71 and 72 of the above described type (in particular refer to FIG. 2 for the section of the convolution generator included between $a_n$ and $A_k$, but operating here on two series $a_n$ and $\hat{a}_n$, $b_n$ and $\hat{b}_n$, a multiplying device 73 and an inverse complex Mersenne transformer 74 (refer to FIG. 1 for the section included between $q.A_k B_k$ and $c_n$).

Multiplier 73 can be simplified by noting that the real and imaginary components of expression (12) can be separately obtained by performing three multiplications instead of four, namely:

$\hat{A}_k \cdot B_k$, $A_k \cdot \hat{B}_k$ and $(A_k - \hat{A}_k)(B_k + \hat{B}_k)$.

The addition of the two first products provides the complex term and the addition and subtraction respective of these terms from the third product, provides the real term.

Furthermore, it is possible to limit $k$ so that it varies between 0 and $p-1$ and to make the difference between the terms according as to whether $k$ is even ($k=2u$) or odd ($k=2u+1$), $u$ varying between 0 and $(p-1/2)$, from which, it is obtained:

$$A_{2u} + j\, \hat{A}_{2u} = ((A_{1,2u} + A_{3,2u} + (-1)^n(A_{2,2u} + A_{4,2u})))$$
$$+ j((\hat{A}_{1,2u} + \hat{A}_{3,2u} + (-1)^u(\hat{A}_{2,2u} + \hat{A}_{4,2u})))$$

$$A_{2u+p} + j\, \hat{A}_{2u+p} =$$
$$((A_{1,2u} - A_{3,2u} - (-1)^u + \frac{p-1}{2}(\hat{A}_{2,2u} - \hat{A}_{4,2u})))$$
$$+ j((-1)^u = \frac{p-1}{2}(A_{2,2u} - A_{4,2u}) + \hat{A}_{1,2u} - \hat{A}_{3,2u})$$

$$A_{2u+2p} + j\,\hat{A}_{2u+2p} = ((A_{1,2u} + A_{3,2u} - (-1)^u(A_{2,2u} + A_{4,2})))$$
$$+ j((\hat{A}_{1,2u} + \hat{A}_{3,2u} - (-1)^u(\hat{A}_{2,2u} + \hat{A}_{4,2u})))$$

$$A_{2u+3p} + j\,\hat{A}_{2u+3p} =$$
$$((A_{1,2u} - A_{3,2u} + (-1)^u + \frac{p-1}{2}(\hat{A}_{2,2u} - \hat{A}_{4,2u})))$$
$$+ j((-(-1)^u + \frac{p-1}{2}(A_{2,2u} - A_{4,2u}) + \hat{A}_{1,2u} - \hat{A}_{3,2u}))$$

Also similar expressions can be written for $k=2u+1$ as in expression (9).

This allows the simplification of the devices 71 and 72.

Numerous applications proceed from such simplification. The first application consists in simplifying the filter with real coefficients operating on real signals. Two consecutive blocks $\{a_n\}$ and $\{a_{n+4p}\}$ will be associated to have a sequence $\{a_n + j\, a_{n+4p}\}$ and a complex convolution performed with the sequence of real coefficients ($\{b_n\}$).

However, the most attractive application is the one which consists in filtering samples of signals in quadrature $\{a\}$ and $\{a\}$ issued, for instance, from an Hilbert transformer, by using two coefficient sets $\{b\}$ and $\{b\}$. In this case, terms $\{a_n\}$ and $\{a_n\}$ are grouped in blocks so that it is possible to convert the aperiodic convolutions (filtering) back into circular convolutions (as shown above) and then, the convolutor of FIG. 3 is used. If terms $\{b_n\}$ and $\{b_n\}$ are fixed, $\{qB_k\}$ and $\{qB_k\}$ are directly stored, which allows saving a complex Mersenne transformation. On the other hand, if these coefficients vary as needed for equalization, their transformation will be performed in accordance with the scheme of FIG. 3.

While the invention has been particularly shown and described with reference to the preferred embodiment thereof, it will be understood by those skilled in the art that various changes in form and details may be made therein without departing from the spirit and scope of the invention.

What is claimed is:

1. A device for generating the convolution function of two series of $4p$ discrete values $\{a_n\}$ and $\{b_n\}$, where $p$ is a prime number, said device including:
   a. first means for introducing sequentially and in series by bit, terms $\{a_n\}$ into a device computing by successive accumulations, the following terms:

$$A_{1,k} = ((\sum_{s=0}^{p-1} a_{4s} \cdot 2^{<4sk>}))$$

$$A_{2,k} = ((\sum_{s=0}^{p-1} a_{4s+1} \cdot 2^{<(4s+1)k>}))$$

$$A_{3,k} = ((\sum_{s=0}^{p-1} a_{4s+2} \cdot 2^{<(4s+2)k>}))$$

and $$A_{4,k} = ((\sum_{s=0}^{p-1} a_{4s+3} \cdot 2^{<(4s+3)k>}))$$

wherein $k$ takes all the integer values comprised between 0 and $4p-1$, the double parentheses $((—))$ indicate that the enclosed quantity is to be taken modulo the Mersenne number $M_p$ ' $2^p-1$ and the brackets $<—>$ indicate that the enclosed quantity is to be taken modulo $p$;

b. a second means connected to receive and to retain the terms $A_{i,k}$ computed by said first means and for providing a cyclic access to said terms;
   c. a third means connected to said second means for adding and subtracting alternatively said terms $A_{i,k}$ by pairs so as to provide the following terms:

$$A_k' = ((A_{1,k} + (-1)^k A_{3,k}))$$

and $$A_k'' = ((A_{2,k} + (-1)^k A_{4,k})),$$

wherein $k$ takes all the integer values comprised between 0 and $4p-1$;

d. a fourth means coupled to said third means for computing terms $\{A_k\} = A_k' + j^k A_k''$; where $j$ equals the square root of minus one;
   e. a fifth means comprising a second set of said first to said fourth means, said fifth means acting to process the terms of said series $\{b_n\}$ so as to provide terms $\{B_k\} = B_k' + j^k B_k''$;
   f. a sixth means responsive to the $\{B_k\}$ terms from said fifth means for multiplying each term $B_k$ by a given coefficient $q$;
   g. a seventh means connected to said fourth means and to said sixth means for multiplying said series $A_k$ and $qB_k$ together term by term to provide a sequence $qC_k = ((q\, A_k B_k))$;
   h. an eighth means including switching means for selecting sequentially and in series by bit, said terms $\{qC_k\}$ generated by said seventh means and a device connected to said switching means and computing by successive accumulations, the following terms:

$$c_{1,m} = ((q \sum_{s=0}^{p-1} C_{4s} \, 2^{<-4sm>}));$$

$$c_{2,m} = ((q \sum_{s=0}^{p-1} C_{4s+1} \, 2^{<-(4s+1)m>}));$$

$$c_{3,m} = ((q \sum_{s=0}^{p-1} C_{4s+2} \, 2^{<-(4s+2)m>}));$$

and $$c_{4,m} = ((q \sum_{s=0}^{p-1} C_{4s+3} \, 2^{<-(4s+3)m>}));$$

where $m$ takes all integer values comprised between 0 and $p-1$;

i. a ninth means cyclically connected to said eighth means and provided with cyclic access to the terms $c_{i,m}$ provided by said eighth means;
   j. a tenth means receiving the terms cyclically accessed by said ninth means and alternately adding and subtracting pairs of terms $c_{i,m}$; and
   k. an eleventh means receiving the output of said tenth means and providing the circular convolution terms $\{c_n\}$ by adding and subtracting said terms provided by said tenth means.

2. A convolution function generator according to claim 1 characterized in that said first means includes in series, a storage device for recirculating the input data, an adder-accumulator receiving data from said storage device and a shift register whose output is fed back to a second input of said adder-accumulator.

3. A device for generating the convolution function of two series of $4p$ discrete values $\{a_n\}$ and $\{b_n\}$, where $p$ is a prime number, characterized in that it includes:
   a. a first means including a pair of devices, each device receiving sequentially and in series by bit the terms $\{a_n\}$ or $\{b_n\}$ and providing as output the associated sets of terms $$A_{1,k} = ((\sum_{s=0}^{p-1} a_{4s} \cdot 2^{<4sk>}))$$

$$A_{2,k} = ((\sum_{s=0}^{p-1} a_{4s+1} \cdot 2^{<(4s+1)k>}))$$

-continued $$A_{3,k} = \left(\left(\sum_{s=0}^{p-1} a_{4s+2} \cdot 2^{<(4s+2)k>}\right)\right)$$

$$A_{4,k} = \left(\left(\sum_{s=0}^{p-1} a_{4s+3} \cdot 2^{<(4s+3)k>}\right)\right)$$

from the device receiving the $\{a_n\}$ terms and $$B_{1,k} = \left(\left(\sum_{s=0}^{p-1} b_{4s} \cdot 2^{<4sk>}\right)\right)$$

$$B_{2,k} = \left(\left(\sum_{s=0}^{p-1} b_{4s+1} \cdot 2^{<(4s+1)k>}\right)\right)$$

$$B_{3,k} = \left(\left(\sum_{s=0}^{p-1} b_{4s+2} \cdot 2^{<(4s+2)k>}\right)\right)$$

$$B_{4,k} = \left(\left(\sum_{s=0}^{p-1} b_{4s+3} \cdot 2^{<(4s+3)k>}\right)\right)$$

from said device receiving the $\{b_n\}$ terms wherein $k$ takes all the integer values from 0 to $p-1$, the double parentheses ((—)) indicate that the enclosed quantity is to be taken modulo the Mersenne number $M_p = 2^p - 1$ and the brackets $<—>$ indicate that the enclosed quantity is to be taken modulo $p$;

b. a pair of second means for providing cyclic access to said $A_{i,k}$ and $B_{i,k}$ terms provided by said devices of said first means;

c. a pair of third means connected to said second means for alternately adding and subtracting by pairs the terms $A_{i,k}$ and $B_{i,k}$ respectively as received from the associated one of said second means wherein $k$ successively takes all the integer values from 0 to $p-1$;

d. a pair of fourth means each connected to one of said third means and each for computing one of the complex Mersenne transforms $\{A_k\}$ or $\{B_k\}$ of series $\{a_n\}$ or $\{b_n\}$, from the terms provided by said third means;

e. a fifth means connected to the one of said fourth means computing the transform $\{B_k\}$ for multiplying terms $B_k$ by a given constant value $q$;

f. a sixth means connected to said fourth and fifth means for multiplying term by term, the terms $A_k$ provided by the $\{A_k\}$ one of said fourth means with the corresponding terms provided by said fifth means to supplying a sequence of terms $C_k$;

g. a seventh means connected to said sixth means for sequentially receiving in series by bit, the terms $C_k$ provided by said sixth means, and including a device computing by successive accumulations, the following terms:

$$c_{1,m} = \left(\left(q \sum_{s=0}^{p-1} C_{4s} 2^{<-4sm>}\right)\right);$$

$$c_{2,m} = \left(\left(q \sum_{s=0}^{p-1} C_{4s+1} 2^{<-(4s+1)m>}\right)\right);$$

$$c_{3,m} = \left(\left(q \sum_{s=0}^{p-1} C_{4s+2} 2^{<-(4s+2)m>}\right)\right);$$

and $$c_{4,m} = \left(\left(q \sum_{s=0}^{p-1} C_{4s+3} 2^{<-(4s+3)m>}\right)\right)$$

for the values of $m$ comprised between zero and $p-1$;

h. an eighth means for providing cyclic access to successive ones of the terms $c_{i,m}$ generated by said seventh means;

i. a ninth means for alternately adding and subtracting pairs of the terms $c_{i,m}$ made accessible by said eighth means; and j. a tenth means connected to said ninth means for computing the real and imaginary components of the inverse Mersenne transforms of terms $C_k$ from the terms provided by said ninth means.

4. A convolution function generator according to claim 3 characterized in that said first means includes in series, a storage device for recirculating the input data, an adder-accumulator receiving data from said storage device and a shift register whose output is fed back to a second input of said adder-accumulator.

5. A digital filter with filtering coefficients $\{b_n\}$ characterized in that it includes:

a first means for separating the input signal samples into blocks of $2p$ samples;

a pair of second means each for appending a sequence of $2p$ consecutive zeroes to alternate blocks of $2p$ samples;

a third means including a pair of convolution functions generators, each connected to one of said second means to receive therefrom alternate ones of said blocks of $2p$ samples with an appended sequence of zeroes and forming a sequence of terms representing a convolution of said blocks of samples with appended zeroes; and a fourth means connected to both said convolution function generators of said third means to add sequentially the terms provided by said function generators.

6. A digital filter with filtering coefficients $\{b_n\}$ characterized in that it includes:

a first means for separating samples of an input signal into blocks of $2p$ consecutive samples and having a pair of outputs, each supplying alternate blocks of said samples;

a second means comprising a first and a second complex Mersenne converter, one connected to each of said outputs of said first means and each of said converters including:

a. a means for appending a sequence of $2p$ zeroes to each of said blocks of samples;

b. an input storage device for recirculating the input data;

c. an accumulator and shift register assembly receiving said recirculated data and d. an adder-subtractor fed by said shift register;

each converter generating a transformed sequence of said samples;

a memory containing amplified complex Mersenne transforms of said filtering coefficients;

a pair of multiplying means fed by said memory and each multiplying means also connected to one or the other of said first and second converters;

a pair of adding means connected to the outputs of said multiplying means, one of said adding means for adding the real components of the outputs of said multiplying means, and the other adding the corresponding imaginary components of said outputs;

an inverse complex Mersenne converter connected to the outputs of said pair of adding means, said inverse converter including:

a recirculation device, an accumulator and shift register assembly connected to said recirculation device and, an adder-subtractor combining the real terms provided by said shift register assembly.

7. A digital filter according to claim 6 characterized in that said first and second complex Mersenne converters and said inverse complex Mersenne converter, each include means for interleaving into said shift register of said assembly, data resulting from the processing of two consecutive data blocks applied to the same converter; and an adder-subtractor means for computing from one block and from the terms stored in said shift register from the preceding block, the new terms to be stored in said shift register.

8. A digital filtering device characterized in that it includes:

a first means for separating the samples of the signal to be filtered into blocks of $2p$ samples where $p$ is a prime number;

a second means for appending to each block a sequence of $2p$ zeroes, thus forming blocks $a_n$ of words;

a third means responsive to said first and second means for retaining two consecutive blocks $a_n$ and $a_n+4p$;

a fourth means having an input from said third means and for providing terms $\{A_k\}$ and $\{A_k\}$ representing the real and imaginary terms respectively of the complex Mersenne transforms of the series of blocks $\{a_n\}$ and $\{a_n+4p\}$;

a fifth means for storing the Mersenne transform $\{B_k\}$ of a group of amplified coefficients of $\{b_n\}$ defining the filter with a gain $q$;

a sixth means receiving said terms of both of said transforms and for producing, term by term, the products of $qA_k B_k$ and $qA_k B_k$;

a seventh means connected to said sixth means for adding these products term by term; and an eighth means receiving said terms from said seventh means and providing the inverse complex Mersenne transforms of said terms as a digital representation of a filtered input signal.

* * * * *